United States Patent
Zeng et al.

(10) Patent No.: US 11,575,341 B1
(45) Date of Patent: Feb. 7, 2023

(54) METHOD OF ROTOR TEMPERATURE PREDICTION FOR AN ELECTRIC MOTOR

(71) Applicant: GM Global Technology Operations LLC, Detroit, MI (US)

(72) Inventors: Wei Zeng, Oakland Township, MI (US); Scott E. Parrish, Farmington Hills, MI (US); Jeffrey Wentz Yambor, Clawson, MI (US); Young J. Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/514,239

(22) Filed: Oct. 29, 2021

(51) Int. Cl.
*H02P 29/66* (2016.01)
*B60L 3/00* (2019.01)

(52) U.S. Cl.
CPC .......... *H02P 29/664* (2016.11); *B60L 3/0061* (2013.01); *B60L 2240/421* (2013.01); *B60L 2240/423* (2013.01); *B60L 2240/425* (2013.01); *H02P 2207/01* (2013.01)

(58) Field of Classification Search
CPC .. H02P 29/664; H02P 2207/01; B60L 3/0061; B60L 2240/421; B60L 2240/423; B60L 2240/425
See application file for complete search history.

(56) References Cited

U.S. PATENT DOCUMENTS

| | | | |
|---|---|---|---|
| 2015/0029620 A1* | 1/2015 | Negre | H02P 29/032 361/24 |
| 2020/0036311 A1* | 1/2020 | Freire | F03D 9/22 |
| 2022/0052633 A1* | 2/2022 | Reddy | H02P 23/0022 |

OTHER PUBLICATIONS

U.S. Appl. No. 17/110,865, filed Dec. 3, 2020, pp. 1-23.

* cited by examiner

*Primary Examiner* — Zoheb S Imtiaz
(74) *Attorney, Agent, or Firm* — Vivacqua Crane, PLLC (57) ABSTRACT

A method for predicting a rotor temperature of an electric motor for an electric vehicle. The method includes measuring at least one of an operating parameter of the electric motor; inputting the at least one of the operating parameter of the electric motor into a predetermined regression model to predict a rotor temperature of the electric motor; and communicating the rotor temperature of the electric motor to a vehicle control module for managing the electric motor. The operating parameters includes a measured stator temperature, a torque level output, a rotor speed, and a coolant flowrate of the fixture electric motor. The electric motor may be that of an induction motor.

10 Claims, 6 Drawing Sheets

Regression model (a – g are constants)

$(T_r - T_s) = (a \cdot T_s \cdot S - b \cdot S - c \cdot T_s + d) \cdot A$ $A = e^{(S \cdot (e \cdot T_s - f) - (g \cdot T_s - h)) \cdot N} - B$ $B = g e^{\dot{V} \cdot (1-N)}$ $T_r$ - rotor temp, $T_s$ - stator temp., $S$ - speed, $N$ - torque level, $\dot{V}$ – flow rate

FIG. 5A

Generic regression model $(T_r - T_s) = f(T_s, S) \cdot A$ $A = f(T_s, S, N) - B$  or  $a = f(T_s, S, N) \cdot B$    $B = f(\dot{V}, N)$ $T_r$ - rotor temp, $T_s$ - stator temp., $S$ - speed, $N$ - torque level, $\dot{V}$ – flow rate

METHOD OF ROTOR TEMPERATURE PREDICTION FOR AN ELECTRIC MOTOR

INTRODUCTION

The present disclosure relates to a method of predicting the rotor temperature of an electric motor, more particularly to an induction motor.

Electric motors are typically used for propulsion of electrical vehicles including hybrid electric vehicles. Electric motors require accurate measurements of motor temperatures during operation to provide optimum motor performance, to avoid inducing thermal overprotection which could limit performance, and to maximize motor life expectancy. It is essential to measure or estimate the temperature of the rotor of the electric motor for temperature conditions during operation. However known techniques to ascertain electric motor temperature during operation do not provide for direct and non-destructive temperature measurement of the rotor, especially on rotor surface area in the air gap due to inaccessibility of the rotor.

Known temperature measurements include a back-EMF method which indirectly estimates a rotor magnet overall temperature for permanent magnet motors. However, this method is not applicable to induction type electric motors, also referred to as induction motors, due to the induction motors not having permanent magnets in the rotor, thus lacking a back-EMF. At present, a suitable method to measure rotor temperature of induction motors is not available.

Thus, while current motor temperature measurement systems achieve their intended purpose, there is a need for a new and improved system and method for measurement or prediction of electric motor rotor temperature during operation of the motor.

SUMMARY

According to several aspects, a method for predicting a rotor temperature of an electric motor for an electric vehicle is disclosed. The method includes measuring at least one operating parameter of the electric motor; inputting the at least one operating parameter of the electric motor into a predetermined regression model to predict a rotor temperature of the electric motor; and communicating the predicted rotor temperature of the electric motor to a control module for managing at least one thermal limits of the electric motor.

In another aspect of the present disclosure, the at least one operating parameter of the electric motor may include a torque output, a rotor speed, a stator temperature, and a coolant flow rate.

In another aspect of the present disclosure, the predetermined regression model is a mathematic relationship between a measured rotor temperature of a reference electric motor and at least one measured operating parameter of the reference electric motor including a torque output, a rotor speed, a stator temperature, and a coolant flow rate.

In another aspect of the present disclosure, the reference electric motor is one of: (i) a reference fixture electric motor configured to have substantially the same performance and operating characteristics as that of the vehicle electric motor, and (ii) a reference modified production electric motor having means to measure the rotor temperature of the modified vehicle electric motor.

In another aspect of the present disclosure, the regression model is developed by: operating the reference electric motor at multiple predetermined rotor speeds; operating the reference electric motor at multiple predetermined torque levels at each of the multiple predetermined rotor speed levels; measuring a temperature difference between a rotor temperature and a stator temperature of the reference electric motor at each of the at multiple predetermined torque levels at each of the multiple predetermined rotor speeds; measuring at least one of operating parameter of the reference electric motor at each of the at multiple predetermined torque levels at each of the multiple predetermined rotor speed levels; and using regression analysis to develop a mathematic relationship between a difference in the measured rotor temperature and the measured stator temperature of the reference electric motor versus the at least one measured operating parameter of the reference electric motor.

In another aspect of the present disclosure, the at least one measured operating parameter of the reference electric motor includes a stator temperature, a torque level output, a rotor speed, and a coolant flowrate.

In another aspect of the present disclosure, the regression model expresses a causal relationship between a difference in rotor temperature minus stator temperature as a function of the at least one measured operating parameter of the reference electric motor.

In another aspect of the present disclosure, the mathematic relationship is calibrated against the measured differences between stator temperatures and rotor temperatures and the at least one measured operating parameter of the reference electric motor.

According to several aspects, a method of developing a predictive model to predict a rotor temperature of an electric motor in a vehicle. The method includes operating a reference induction motor at multiple predetermined coolant flow rate levels; operating the reference induction motor at multiple predetermined rotor speed levels at each of the multiple predetermined coolant flow rate levels; operating the reference induction motor at multiple predetermined torque levels at each of the multiple predetermined rotor speed levels at each of the multiple predetermined coolant flow rate levels; measuring a rotor temperature, a stator temperature, and an operating parameter of the reference induction motor at each of the at multiple predetermined torque levels at each of the multiple predetermined rotor speed levels for each of the multiple predetermined coolant flow rate levels; and developing a mathematic relationship between a difference between the measured stator temperature and the measured rotor temperature of the reference induction motor as a function of the measured operating parameter.

According to several aspects, a method for predicting a rotor temperature of an electric motor for an electric vehicle. The method includes measuring at least one of a torque level output, a rotor speed, a stator temperature, and a coolant flow rate of the electric motor; inputting the measured at least one of the torque level output, the rotor speed, the stator temperature, and the coolant flow rate of the electric motor into a predetermined predictive model to predict a rotor temperature of the electric motor; and communicating the predicted rotor temperature of the electric motor to a control module for managing at least one thermal limits of the electric motor.

In another aspect of the present disclosure, the predetermined predictive model is a regression model expressing a causal relationship between a difference in rotor temperature minus stator temperature versus the at least one measured operating parameter of the reference electric motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale, and some features may be exaggerated or minimized to show details of particular features. The specific structural and functional details disclosed are not intended to be interpreted as limiting, but as a representative basis for teaching one skilled in the art as to how to practice the disclosed concepts.

As used herein, a control module means any one or various combinations of one or more processors, associated memory, and other components operable to execute a software, firmware, program, instruction, routine, code, and algorithm to provide the described functions. Processors include, but are not limited to, Application Specific Integrated Circuits (ASIC), electronic circuits, central processing units, microprocessors, and microcontrollers. Associated memory includes, but not limited to, read only memory (ROM), random access memory (RAM), and electrically programmable read only memory (EPROM). Functions of a control module as set forth in this disclosure may be performed in a distributed control architecture among several networked control modules. A control module may include a variety of communication interfaces including point-to-point or discrete lines and wired or wireless interfaces to other control modules.

Software, firmware, programs, instructions, routines, code, algorithms and similar terms mean any control module executable instruction sets including methods, calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing vehicle operation. Alternatively, routines may be executed in response to occurrence of an event, software calls, or on demand via user interface inputs or requests.

U.S. patent application Ser. No. 17/110,865, titled "Apparatus and Method for Rotor Temperature Measurement", filed on Dec. 3, 2020, (herein "US Appl. No. '865") teaches a method for automobile vehicle rotor temperature measurement of an electric motor. Instead of implementing in-situ rotor temperature measurement techniques in electric vehicles as taught in US. Appl. No. '865, a novel method was developed to estimate or predict rotor temperatures in electric vehicles based on measurable, estimable, or otherwise ascertainable electric motor operating parameters such as torque output, rotor speed, stator temperature, and coolant flow rate. This novel method is a predictive physical model or math-based regression model based on rotor temperature measurements at all relevant motor operating conditions of a reference electric motor. The rotor temperature measurements of the reference electric motor may be based on the techniques as taught by US. Appl. No. '865. US, which is incorporated herein by reference in its entirety.

The method of predicting a rotor temperature of an electric motor for an electric vehicle is disclosed. The electric vehicle may include fully electric or hybrid land vehicles, water vehicles, and air vehicles that utilize at least one electric motor for propulsion. The method utilizes a math-based regression model for predicting the rotor temperature of the electric motor by inputting one or more of a torque output, rotor speed, stator temperature, and coolant flow rate of the electric motor. The method is especially applicable to electric induction motors due to the characteristic absent of a back-EMF that is typically used to estimate rotor temperatures for most electric motors. The math-based regression model may be stored as a software routine or as a look-up table on non-transitory computer-readable memory media and executable by a control module for controlling the performance of the induction motor and for managing thermal protection to avoid exceeding thermal limits of the induction motor.

The math-based regression model, also referred to as "the regression model" for brevity, is developed from experimental data gathered from a reference motor. In one embodiment, the reference motor may be that of a fixed laboratory motor, also known as a fixture motor, configured to have substantially the same performance and operating characteristics as that of a production motor. Having substantially the same performance and operating characteristics means having within +/−10% of torque output, rotor speed, stator temperature, and coolant flow rate for a given power input of the production induction motor. In another embodiment, the reference motor may be that of a modified production motor that is configured such that the torque output, rotor speed, stator temperature, and coolant flow rate may be directly measured, estimated, or otherwise ascertained. The reference fixture motor and reference modified production motor may be that of an induction electric motor.

Figure 1:
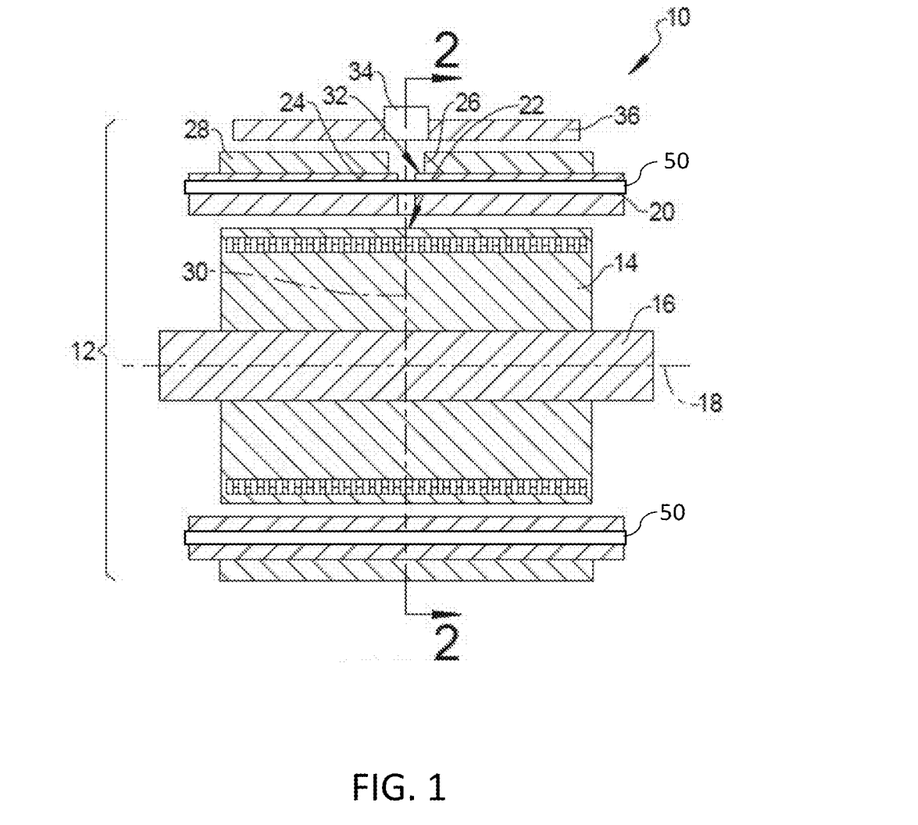
FIG. 1 is a front elevational view of an induction motor having an apparatus and method for rotor temperature measurement according to an exemplary aspect.

FIG. 1 shows an exemplary reference fixture motor 12 that is configured to have substantially the same operating and performance characteristics as that of a production induction motor for an electric vehicle. The motor 12 includes a rotor 14 for rotating an output shaft 16 with respect to a shaft axis of rotation 18. The rotor 14 is positioned withing a stator 20. To accurately and directly determine a rotor temperature $T_{rotor}$ at a rotor surface 22 a first through aperture 24 is created through the stator 20. The first through aperture 24 provides a line-of-sight access to the rotor surface 22. To accurately and directly determine a stator temperature $T_{stator}$ a second through aperture 26 is created through a housing 28 which supports the stator 20. The first through aperture 24 and the second through aperture 26 are coaxially aligned on a common axis 30. The second through aperture 26 provides a line-of-sight access to a stator surface 32. To determine the rotor temperature $T_{rotor}$ at the rotor surface 22 and the stator temperature $T_{stator}$ at the stator surface 32 a sensor 34 such as an infrared sensor is mounted using a sensor mount 36 to the housing 28.

An internal passageway 50 for a coolant oil flow through the motor 12 is provided for managing the temperature of the motor 12. The coolant oil may be that of a motor oil or a hydraulic oil such as an automatic transmission fluid (ATF). The output shaft 16 of the fixture motor 12 may be connected to sensors to measure the torque level output and rotor speed.

Figure 2:
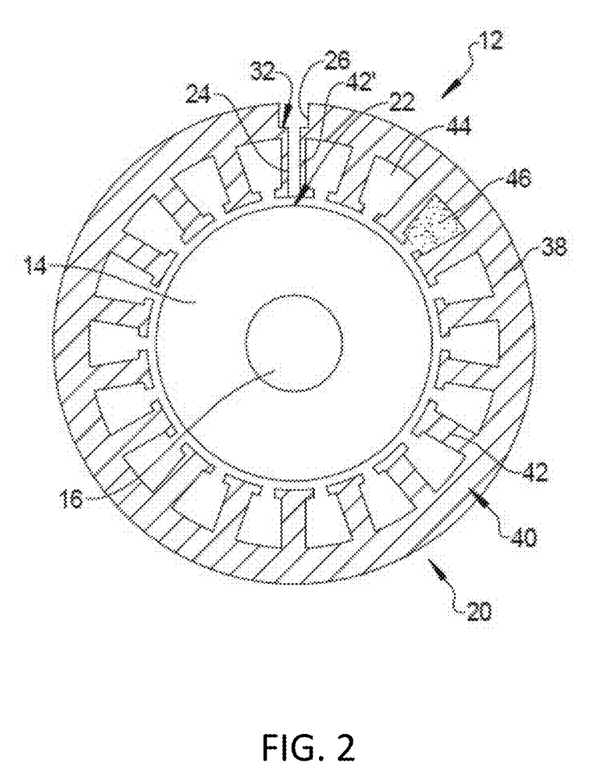
FIG. 2 is a cross-sectional end elevational view taken at section 2 of FIG. 1.

FIG. 2 shows a cross-section of the motor 12 along section line 2-2. The stator 20 includes multiple stator laminations 38 individually having an outer ring 40 and multiple inwardly extending lamination teeth 42. Multiple stator slots 44 are provided individually positioned between successive ones of the lamination teeth 42. Stator windings 46 made for example of copper wire are positioned within the stator slots 44. The first through aperture 24 is created for example by boring centrally through an exemplary one of the lamination teeth 42'. In the example shown, a first diameter of the first through aperture 24 is smaller than a second diameter of the second through aperture 26 which provides the line-of-sight access to the rotor surface 22 and the line-of-sight access to stator surface 32 by the sensor 34.

It should be noted that the first through aperture 24, the second through aperture 26, sensor 34, and sensor mount 36 of the reference fixture motor 12 are provided in the reference fixture motor 12 to obtain rotor temperature data for the development of the regression model. However, the first through aperture 24, the second through aperture 26, sensor 34, and sensor mount 36 are not required in the production motor, since the regression model is used to predict the rotor temperature of the production motor.

Figure 3:
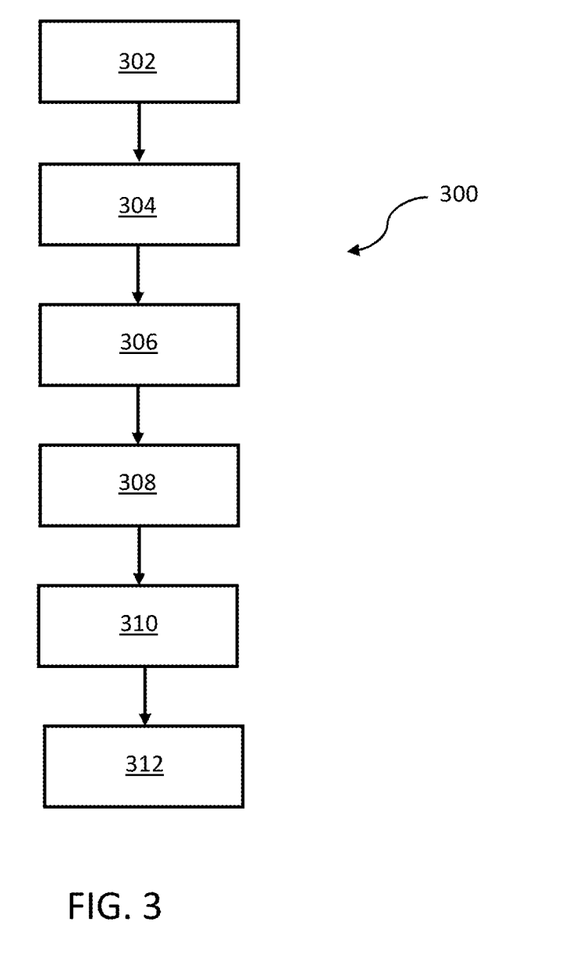
FIG. 3 is a flow block diagram of a method of developing a regression model for predicting the rotor temperature of an induction motor.

FIG. 3 shows a flow block diagram for a method of generating the regression model for predicting a rotor temperature of a production electric motor of an electric vehicle. The method starts in block 302, where the reference fixture motor is configured to have substantially the same, if not the same, performance and operating characteristics as that of the production electric motor.

Moving to block 304, the reference fixture motor is operated at multiple predetermined rotor speeds, also referred to as motor speed, which is measured as revolution per min (rpm). Each of the predetermined rotor speeds is at a discrete rpm, from $0^+$ rpm to maximum operating rpm, which together represents the overall designed operating range of the production motor. At each of the predetermined rotor speeds, the reference fixture motor is operated at multiple predetermined torque output levels ranging from $0^+$ to 100% torque output. The rotor temperature, stator temperature, and coolant flow rate are measured at each of the multiple predetermined torque output levels within each of the multiple predetermined rotor speeds.

Figure 4:
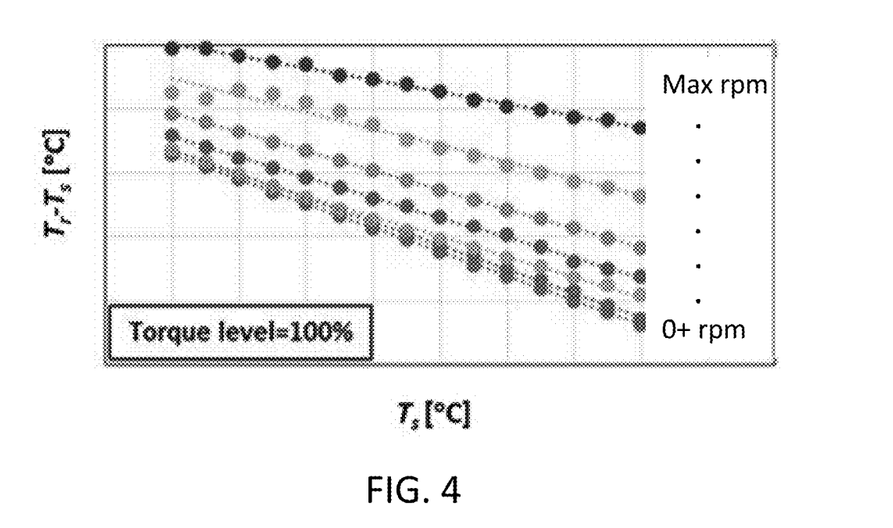
FIG. 4 is an exemplary graph showing a relationship between the difference in measured rotor temperatures minus measured stator temperatures versus the measured stator temperature for multiple predetermined motor speeds at 100% torque output.

Moving to block 306 the difference in the measured rotor temperature minus the measured stator temperature is plotted against the measured the stator temperature at the various predetermined rotor speeds for each of the predetermined torque levels. Shown in FIG. 4 is exemplary graph showing the relationship between the difference in the measured rotor temperature minus the measured stator temperature (the y-axis) versus the measured the stator temperature (shown in the x-axis) at 100% torque level for each of the predetermined rotor speeds shown. It is preferable that the predetermined rotor speeds and torque levels cover extreme conditions that can be expected to be experienced by the vehicle electric motor.

Figure 5A:
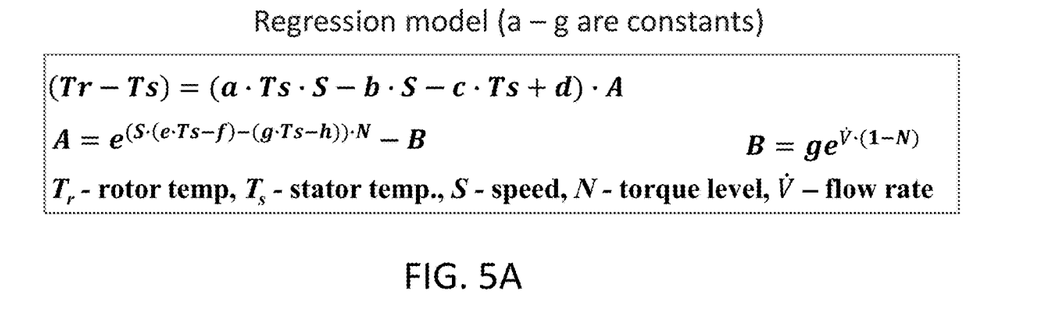
FIG. 5A is an exemplary regression model for predicting the rotor temperature of an induction motor based on the relationship of the operating parameters shown in the graph of FIG. 4.
Figure 5B:
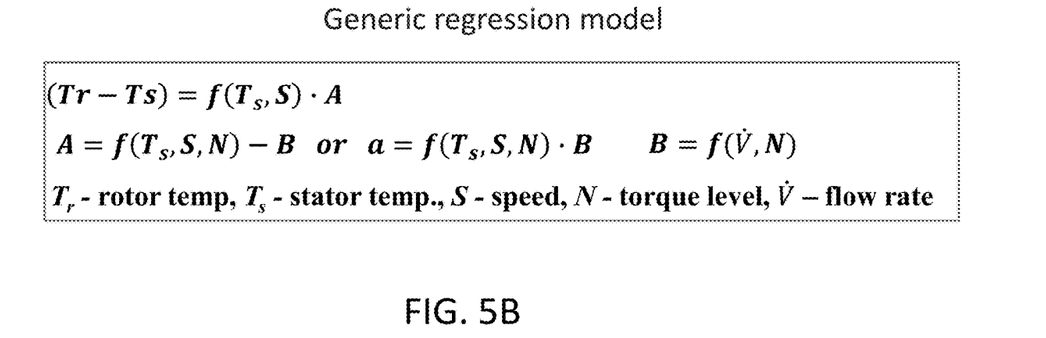
FIG. 5B is an exemplary generic regression model for predicting the rotor temperature of an induction motor based on the relationship of the operating parameters shown in the graph of FIG. 4.

Moving to block 308, using regression analysis, a regression model is developed for the causal relationship between the difference in the rotor temperature minus the stator temperature as a function of the stator temperature, rotor speed, torque level, and coolant flow rate of the fixture motor. Regression analysis is a set of statistical methods used for the estimation of relationships between a dependent variable, which in this case is the difference of the rotor temperature and the stator temperature, and multiple independent variables, which in this case are the stator temperature, torque level, rotor speed, and coolant flow rate. Regression analysis is used to assess the strength of the relationship between these variables for modeling the relationship between them. An exemplary regression model is shown in FIG. 5A for predicting rotor temperature of a production electric motor by using the measured data from the reference fixture model. Shown in FIG. 5B is an exemplary generic regression model for predicting rotor temperature of a production electric motor by using the measured data from the reference fixture model. In FIGS. 5A and 5B, a-g are constants specific to the motor that the equations represents.

Moving to block 310, the predicted rotor temperature output from the regression model is validated against a measured rotor temperature of the reference fixture motor operating at the same rotor speed, torque level, and coolant flow rate as inputted into the regression model. The regression model is considered to be within acceptable error if the predicted rotor temperature is plus or minus 10° C. of that of the measured rotor temperature of the reference fixture motor.

Moving to block 312, the developed regression model is stored as a software routine or as a look-up table on non-transitory computer-readable memory media and executable by a control module for controlling the performance of the induction motor and for managing thermal protection to avoid exceeding thermal limits of the induction motor.

Figure 6:
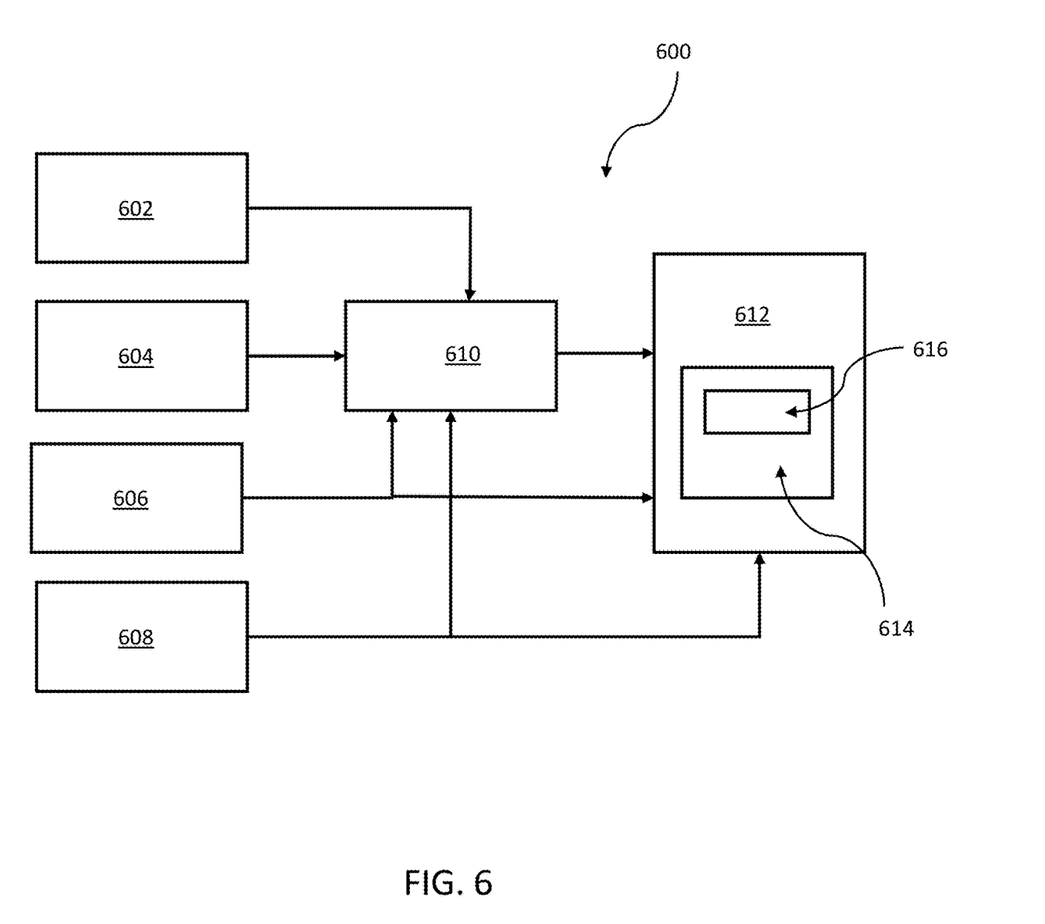
FIG. 6 is a block flow diagram of a method for predicting a rotor temperature of an induction motor for an electric vehicle.

Referring to FIG. 6 is a functional block flow diagram of a method 600 for predicting a rotor temperature of a production electric motor for an electric vehicle by using the developed regression model. In block 602, the rotor speed of the production electric motor is obtained. In block 604, the torque output of the production electric motor is obtained. In block 606, the stator temperature of the production electric motor is obtained. In block 608, the coolant flow rate through the production electric motor is obtained.

Moving to block 610, the obtained torque output, rotor speed, stator temperature, and coolant flow rate are inputted into the regression model to predict the rotor temperature of the electric motor.

Moving to block 612, the predicted rotor temperature from block 610 is communicated to a vehicle or motor controller 614 together with the obtained speed, torque level, stator temperature, and coolant flow rate. The vehicle controller 614 is configured to process the information for the management of the electric motor. The regression model may be stored as a software routine or as a look-up table on a non-transitory computer-readable 616 memory media accessible by the control module 614.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method for predicting a rotor temperature of an electric motor for an electric vehicle, comprising:
    measuring at least one operating parameter of the electric motor;
    inputting the at least one operating parameter of the electric motor into a predetermined regression model to predict a rotor temperature of the electric motor; and
    communicating a predicted rotor temperature of the electric motor to a control module for managing at least one thermal limits of the electric motor;
    wherein the at least one operating parameter of the electric motor comprises of a torque output, a rotor speed, and a stator temperature;
    wherein the at least one operating parameter of the electric motor further comprises a coolant flow rate;
    wherein the predetermined regression model is a mathematic relationship between a measured rotor temperature of a reference electric motor and at least one measured operating parameter of the reference electric motor including a torque output, a rotor speed, a stator temperature, and a coolant flow rate; and
    wherein the regression model is developed by a method comprising of:
    operating the reference electric motor at multiple predetermined rotor speeds;
    operating the reference electric motor at multiple predetermined torque levels at each of the multiple predetermined rotor speeds;
    measuring a rotor temperature and a stator temperature of the reference electric motor at each of the multiple predetermined torque levels at each of the multiple predetermined rotor speeds;
    measuring at least one of operating parameter of the reference electric motor at each of the at multiple predetermined torque levels at each of the multiple predetermined rotor speeds; and
    using regression analysis to develop a mathematic relationship between a difference in the measured rotor temperature and the measured stator temperature of the reference electric motor versus the at least one measured operating parameter of the reference electric motor.

2. The method of claim 1, wherein the reference electric motor is one of: (i) a reference fixture electric motor configured to have substantially a same performance and operating characteristics as that of the electric motor for the electric vehicle, and (ii) a reference modified production electric motor having means to measure the rotor temperature of the modified production electric motor.

3. The method of claim 1, wherein the at least one measured operating parameter of the reference electric motor comprises a stator temperature, a torque level output, a rotor speed, and a coolant flowrate.

4. The method of claim 1, wherein the mathematic relationship is calibrated against the differences between the measured stator temperatures and the measured rotor temperatures and the at least one measured operating parameter of the reference electric motor.

5. The method of claim 1, wherein the regression model expresses a causal relationship between a difference in rotor temperature minus stator temperature as a function of the at least one measured operating parameter of the reference electric motor.

6. A method of developing a predictive model to predict a rotor temperature of an electric motor in a vehicle, comprising:
    operating a reference induction motor at multiple predetermined coolant flow rate levels;
    operating the reference induction motor at multiple predetermined rotor speeds at each of the multiple predetermined coolant flow rate levels;
    operating the reference induction motor at multiple predetermined torque levels at each of the multiple predetermined rotor speeds at each of the multiple predetermined coolant flow rate levels;
    measuring a rotor temperature, a stator temperature, and an operating parameter of the reference induction motor at each of the multiple predetermined torque levels at each of the multiple predetermined rotor speeds for each of the multiple predetermined coolant flow rate levels; and
    developing a mathematic relationship between a difference between the measured stator temperature and the measured rotor temperature of the reference induction motor as a function of the measured operating parameter.

7. The method of claim 6, wherein measured operating parameter includes a stator temperature, a torque level output, a rotor speed, and a coolant flow rate of the reference induction motor.

8. The method of claim 7, further comprising determining a new control variable using a difference between stator temperature and rotor temperature.

9. The method of claim 7, wherein the mathematic relationship developed by using regression analysis.

10. The method of claim 7, wherein the reference induction motor is configured to have substantially the same performance and operating characteristics as that of a vehicle electric motor, and the mathematic relationship represents a difference between the rotor temperature minus the stator temperature as a function of an operating parameters of the vehicle electric motor.

* * * * *